US012730760B2

(12) United States Patent
Medwed et al.

(10) Patent No.: US 12,730,760 B2
(45) Date of Patent: Sep. 8, 2026

(54) MEMORY ISOLATION SECURITY IN A DATA PROCESSING SYSTEM

(71) Applicant: NXP B.V., Eindhoven (NL)

(72) Inventors: Marcel Medwed, Graz (AT); Jan Hoogerbrugge, Helmond (NL)

(73) Assignee: NXP B.V., Eindhoven (NL)

( * ) Notice: Subject to any disclaimer, the term of this patent is extended or adjusted under 35 U.S.C. 154(b) by 170 days.

(21) Appl. No.: 18/604,666

(22) Filed: Mar. 14, 2024

(65) Prior Publication Data

US 2025/0291738 A1 Sep. 18, 2025

(51) Int. Cl.
*G06F 12/14* (2006.01)

(52) U.S. Cl.
CPC .......... *G06F 12/1408* (2013.01); *G06F 12/14* (2013.01); *G06F 12/1458* (2013.01)

(58) Field of Classification Search
CPC ... G06F 12/1408; G06F 12/14; G06F 12/1458
See application file for complete search history.

(56) References Cited

U.S. PATENT DOCUMENTS 10,922,439 B2 2/2021 Von Bokern et al.
2012/0120741 A1* 5/2012 Kim ........................ G11C 16/10 365/189.14
2016/0285892 A1 9/2016 Kishinevsky et al.
2018/0121117 A1* 5/2018 Berger .................. G06F 3/0673
2019/0042402 A1* 2/2019 Chhabra ............. G06F 9/45558
2020/0201789 A1* 6/2020 Durham ................ H04L 9/0894
2020/0257827 A1* 8/2020 Kounavis .............. H04L 9/0637
2021/0034364 A1* 2/2021 Li ......................... G06F 9/3824
2021/0374000 A1* 12/2021 Chhabra ............... H04W 12/10
2023/0126741 A1 4/2023 Chritz et al.

* cited by examiner

*Primary Examiner* — Theodore C Parsons
*Assistant Examiner* — Howard H. Louie

(57) ABSTRACT

A data processing system is provided that includes a memory, a processor, and a memory integrity circuit. The memory includes a plurality of memory regions configured to store information. The processor is configured to execute instructions to access an address in the memory. The memory integrity circuit is coupled to the processor and to the memory, and configured to validate read and write accesses to the memory by the processor. The memory integrity circuit validates a write access to an address of a memory region of the plurality of memory regions in response to n number of the read accesses being validated prior to the write access, where n is an integer, and in response to correctly calculating a message authentication code (MAC) of a combination of encrypted data stored at the address and a tweak value. In another embodiment, a method is provided for isolation security for the memory.

20 Claims, 2 Drawing Sheets

MEMORY ISOLATION SECURITY IN A DATA PROCESSING SYSTEM

BACKGROUND

Field

This disclosure relates generally to data processing, and more particularly, to memory isolation security in a data processing system.

Related Art

A memory protection unit (MPU) is a circuit in a data processing system that limits access of memory and peripheral resources to only the software that needs to access those resources. Currently, memory protection units (MPUs) are a commonly used solution for logical memory isolation. Logical memory isolation means that connectivity is there to access the memory, but some protocol or device such as a firewall is preventing the memory from communicating with another device. The address range for MPU protection can be in the same address range as that of a central processing unit (CPU) of the device. The main disadvantages of the MPU for small embedded devices is the area it needs and also that any logical isolation, such as a firewall, is prone to misconfiguration and fault attacks.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
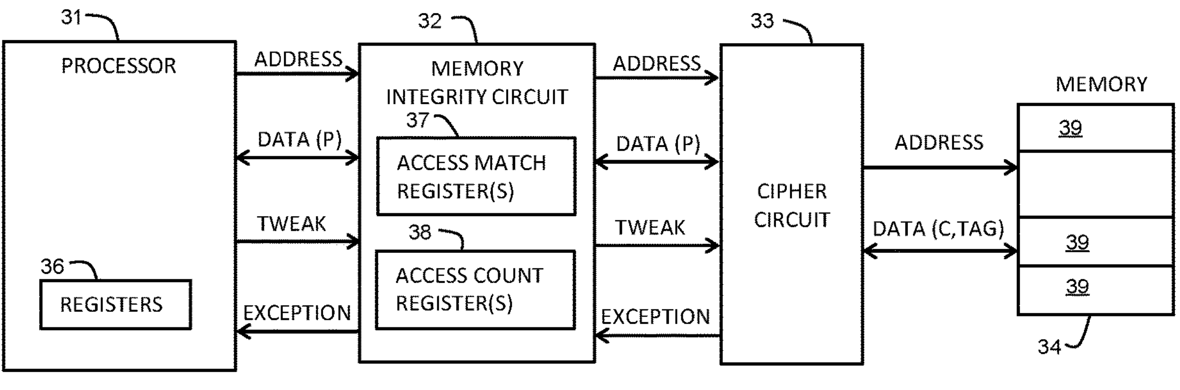
FIG. 1 illustrates a data processing system in accordance with an embodiment.

Generally, there is provided, a data processing system and a method for protecting the integrity of a memory without requiring the use of an MPU. According to one embodiment, a short message authentication code (MAC) is used in combination with several successful read access validations before granting a write access. The MAC is considered "short" because the MAC substitutes for, and occupies the space intended for, parity bits associated with a word in the memory to be protected. However, substituting the short MAC for the parity bits is acceptable because the short MAC can also detect errors. The memory to be protected may be a tightly coupled memory (TCM) for a small embedded microcontroller unit (MCU). Generally, a TCM is implemented using on-chip memory and a dedicated connection to the MCU. By using the short MAC, only a few additional bits per memory word are necessary to achieve sufficient memory isolation security.

In addition to the short MAC, a memory encryption scheme is used which is strong enough to prevent leaked data from being easily recovered. The encryption algorithm may be any symmetric tweakable encryption algorithm that provides sufficient security for the intended application. The memory encryption scheme isolates memory segments, or regions, by incorporating an isolation tweak in the encryption. A memory segment or region may include multiple memory words. Furthermore, the TCM features parity bit memory locations which are used for error detection in case bits flip in the TCM.

The memory encryption scheme prevents data leakage because the leaked data can be considered arbitrary or random and it would be difficult to recover the plaintext. However, the use of memory encryption does not prevent memory data manipulation. In a small embedded MCU, preventing data manipulation is achieved partially by storing a message authentication code (MAC) in the parity bits to create a short MAC. That is, any access has to be carried out with the correct key, which is verified by reading from the requested address and verifying the MAC of the address. However, since the MAC size is limited by the number of parity bits, this may not provide sufficient security for some applications.

It is noted that read accesses to the memory do not need additional security because data leakage is being prevented using the encryption. However, write accesses may need additional security because encryption does not prevent data manipulation. In one embodiment, write isolation security is increased by allowing writes only after a sufficient number of read accesses to a specific memory region have been validated using the short MAC. Using this technique, the security can be increased from, for example, $m=6$, where m is the number of parity bits per memory word, to n times m bits after n valid memory accesses. In an ideal scenario, this does not cause a performance overhead, because the read accesses have been carried out anyway. In a worst case scenario, this means that a write may be delayed by $n-1$ read operations using, e.g., dummy addresses. Using this scheme provides adequate memory isolation for write accesses without using an MPU. Any other peripheral space in the system may still need an MPU for isolation, unless the peripherals also support this same scheme.

In accordance with an embodiment, there is provided a data processing system including: a memory having a plurality of memory regions configured to store information; a processor configured to execute instructions to access an address in the memory; and a memory integrity circuit coupled to the processor and to the memory, the memory integrity circuit configured to validate read and write accesses to the memory by the processor, wherein a write access to an address of a memory region of the plurality of memory regions is validated in response to n number of the read accesses being validated prior to the write access, where n is an integer, and in response to correctly calculating a message authentication code (MAC) of a combination of encrypted data stored at the address and a tweak value. A size of the MAC may be determined by a number of parity bits that were designated per memory word of the memory, and wherein the MAC is stored in a memory portion of the memory reserved for the number of parity bits. The memory may be a tightly coupled memory (TCM) having a dedicated connection to the processor. The data processing system may further include an access match value, the access match value may further include the tweak value concatenated with a truncated address of the memory region. The access match value may be stored in a register of the processor. Each of the n number of read accesses may be directed to one of n number of dummy addresses. An exception may be raised in the processor when the MAC is not correctly calculated. The exception may not be raised until an nth read access is not validated.

In another embodiment, there is provided, a method of providing isolation security for a memory, the method including: storing an access match value comprising a tweak value concatenated with address bits defining an address range in the memory; receiving a request to access the memory; determining that the access is a write access to an address of the memory; determining that an access count of accesses to the memory is less than a predetermined value; choosing a dummy address for a read access; reading a first tag for the dummy address, wherein the first tag equaling a message authentication code (MAC) function of encrypted data and the tweak value for the memory range, wherein the first tag is stored in a memory location of the memory that is sized to store parity bits; calculating a second tag, the second tag equaling a MAC function of encrypted data stored at the dummy address and the tweak value; comparing the second tag with the first tag to determine that the access is valid when the first and second tags compare favorably to each other; updating the access count in response to the first and second tags being equal; determining that the updated access count is equal to the predetermined value; calculating a third tag as a MAC function of encrypted data at the address to be written to and the tweak value; and performing the write access when the third tag and the first tag compare favorably to each other. The dummy address may be an address within the address range. The access match, the access count, and the first tag may be stored in a register of a processor coupled to the memory. The method may further include raising an exception when the first and second tags do not compare favorably to each other. Performing the write access may further include writing the encrypted data and the second tag to the address being written to. A size of the MAC may be determined by a number of parity bits that were designated per word in the memory, and wherein the MAC may be stored in the memory location reserved for the parity bits.

In yet another embodiment, there is provided, a computer program including instructions stored in a non-transitory medium that when executed perform operations including: storing an access match value comprising a tweak value concatenated with address bits defining an address range in the memory; receiving a request to access the memory; determining that the access is a write access to an address of the memory; determining that an access count of accesses to the memory is less than a predetermined value; choosing a dummy address for a read access; reading a first tag for the dummy address, wherein the first tag equaling a message authentication code (MAC) function of encrypted data and the tweak value for the memory range, wherein the first tag is stored in a memory location of the memory that is sized to store parity bits; calculating a second tag, the second tag equaling a MAC function of encrypted data stored at the dummy address and the tweak value; comparing the second tag with the first tag to determine that the access is valid when the first and second tags compare favorably to each other; updating the access count in response to the first and second tags being equal; determining that the updated access count is equal to the predetermined value; calculating a third tag as a MAC function of encrypted data at the address to be written to and the tweak value; and performing the write access when the third tag and the first tag compare favorably to each other. The dummy address may be an address within the address range. The access match, access count, and first tag may be stored in a register of a processor coupled to the memory. The computer program may further include raising an exception when the first and second tags do not compare favorably to each other. Performing the write access may further include writing the encrypted data and the first tag to the address being written to. A size of the MAC may be determined by a number of parity bits that were designated per word in the memory, and wherein the MAC may be stored in the memory location reserved for the parity bits.

FIG. 1 illustrates data processing system 30 according to an embodiment. Data processing system 30 includes processor 31, memory integrity circuit 32, cipher circuit 33, and memory 34. Data processing system 30 may be implemented on one or more integrated circuits. Processor 31 may be one or more processor cores for executing instructions that access memory 34. Processor 31 may be, for example, a microprocessor, microcontroller, field programmable gate array (FPGA), application-specific integrated circuit (ASIC), or similar device. Processor 31 includes registers 36 and is configured to communicate an address labeled "ADDRESS", plaintext data signals labeled "DATA (P)," a tweak value labeled "TWEAK," and to receive an exception labeled "EXCEPTION." Memory integrity circuit 32 is coupled with processor 31 and is configured to receive the address signals ADDRESS, send and receive the data signals DATA (P), receive the tweak value TWEAK, and to forward the exception to processor 31. Memory integrity circuit 32 includes access match register(s) 37 and access count register(s) 38. In one embodiment, memory integrity circuit 32 is a hardware logic block in processor 31. In another embodiment, memory integrity circuit 32 is implemented as a module separate from processor 31 and may include hardware logic and software. Cipher circuit 33 is coupled to memory integrity circuit 32 and is configured to receive the address signals ADDRESS, send and receive the plaintext data signals DATA (P), receive the tweak value TWEAK, and to provide the exception to memory integrity circuit 32. Cipher circuit 33 performs encryption, decryption, and MAC calculations for data processing system 30. Memory 34 is coupled to cipher circuit 33 to receive the address signals ADDRESS and encrypted data (ciphertext) signals labeled "DATA (C, TAG)", where "C" represents the ciphertext. In one embodiment, encrypted data C and tag value TAG are concatenated and stored in memory 34. Memory 34 may include volatile memory such as static random-access memory (SRAM) or dynamic RAM (DRAM), or a non-volatile memory such as flash memory. Memory 34 is divided into multiple regions 39, where a region is defined using the most significant bits of the address signal ADDRESS. Note that a memory region may include multiple words and is defined by a truncated address.

Cipher circuit 33 provides an encryption C=Enc(P, key, addr, tweak) and plaintext P=Dec(C, key, addr, tweak). Included in the ciphertext C is an isolation tweak which is secret and input to the memory encryption function Enc as well as to the decryption function Dec. The other inputs to the encryption (Enc) and decryption (Dec) are the address (addr), the key, and the plaintext (P). Also, a short message authentication code (MAC) is calculated by applying the function MAC to C. The other input to the MAC is the tweak. Thus, a tag value TAG=MAC (C, tweak). The short MAC is referred to as "short" because is shorter than a normally used MAC, e.g., 128 bits, and it substitutes for and replaces parity bits that would ordinarily be used for error detection, e.g., 6 bits per word.

In one embodiment, when a word is stored in memory 34 at address addr, what is stored at the address is ram [addr] =C|TAG, where C is the encrypted data at the address, and | is the concatenation operator. Typically, encrypted data C would be a word of s bits where, for example, s may be 32 or 64 bits in size and tag value TAG may include m=6 bits.

When a word is read from memory 34, a decryption is carried out by cipher 33 in parallel with a tag calculation. The read access operation succeeds only if the calculated tag equals the stored tag. Plaintext P is only forwarded to a target register of registers 36 of processor 31 if the calculated tag matches the stored tag. If the tweak is incorrect or if C has been manipulated in memory 34, the calculated tag will not be equal to the stored tag=MAC (C, TAG) with a probability of $1-2^{-m}$.

When a word is written to memory 34, first C|TAG is read from a destination address and only if the tag validates, such as for a read access, the write access is performed. This would already prevent invalid writes with a probability of $1-2^{-m}$. However, since write accesses need a higher security probability, another mechanism is added on top of the tag calculation. In that mechanism, access match register 37 (accessMatch) is provided in memory integrity circuit 32 that includes the concatenation of the tweak value and the r most significant bits (MSbs) of address addr, which defines an address region in the memory. A typical value for r could be, e.g., 26. This truncated version of addr is denoted by addr prime (addr'). Thus, accessMatch=tweak|addr'. In addition, access count register 38 (accessCount) is provided with a current number of successful read access validations. Whenever, a memory access takes place, either read or write, where tweak and addr' of the current memory request do not match the current value of accessMatch in register 37, then accessMatch is reinitialized to tweak|addr' and accessCount in register 38 is set to 0. Note, in an example memory size having a 32-bit address space and choosing r=26, accessMatch of register 37 defines a memory region of $2^{(32-r)}$=64 bytes, or 8 memory words if it is assumed a word width of 64 bits.

If a read memory access succeeds, the value accessCount in register 38 is increased by 1. If a write memory access is requested and accessCount is smaller than threshold value n, then n−accessCount−1 additional read memory accesses must be performed and validated before the write access can be validated and the plaintext P can be written. The read accesses, may be for example, "dummy" read accesses. As an example, if n=4 and accessCount equals 3, then no dummy reads need to be performed, because the current write address also needs to be validated and counts for one of the validations. The write access validation increments accessCount to 4. If on the other hand, no reads have been performed in a memory region 39 defined by accessMatch, then 3 dummy reads have to be performed before the actual write access validation can be performed. By including the 3 dummy read validations before allowing a write access, an invalid write request will succeed with only a probability of $1-2^{-n*m}$.

In one embodiment, the addresses used for the dummy reads can be chosen as dummyAddr=addr'+ (addr+i mod 2 (32−r) for i=1 . . . (n−accessCount−1). However, this approach can lead to a scenario where addresses used for dummy reads have already contributed to the access count value accessCount and thus an adversary could gain an advantage. In accordance with one embodiment, this advantage may be mitigated by realizing accessCount as a bitmask of size $2^{n(32-r)}/(s/8)$ which indicates which words within a region have already been accessed by setting the corresponding bits to 1. Then a write is performed if the Hamming weight of accessCount is sufficiently high, and the addresses used for the dummy reads are those indicated by 0 values in the bitmask (with the exception of address value addr itself). In another embodiment, the advantage to the adversary may begin by starting with an empty set of offsets i which have been accessed within a memory region 39. Every time a new offset i within this memory region is accessed, it is added to the list of offsets. Once the list has sufficient entries, a write can be performed. The storage requirement for this would be (32−r)*n bits. In another embodiment, the dummy addresses may be chosen differently.

In order to decrease the overhead of write accesses whenever a new memory region 39 is accessed, such as for example, during copying data from one region 39 to another, two or more instances of accessMatch and accessCount can be maintained in registers 37 and 38, respectively, where each instance corresponds to a different memory region 39. Also, in one embodiment, a mechanism is provided to initialize a region 39 for the first time if a tweak value changes for a given addr'. A tweak value may change when a new user accesses memory 34. A new region can be initialized by either introducing dedicated write instructions for which an exception and accessCount is ignored, or by simply achieving the same behavior via a control register configuration of processor registers 31.

To increase security if a device cannot be reset upon an exception, instead of raising the exception immediately, the exception is not raised until after n number of reads if at least one MAC generated during the read accesses did not match. For read accesses, the delayed exception is acceptable because the read content is encrypted and therefore essentially gibberish. For write accesses, there needs to be a minimum number of reads before a write. Security-wise however, an adversary does not get an oracle which yields information with a probability of $2^{-m}$, but rather $2^{-n*m}$.

Figure 2:
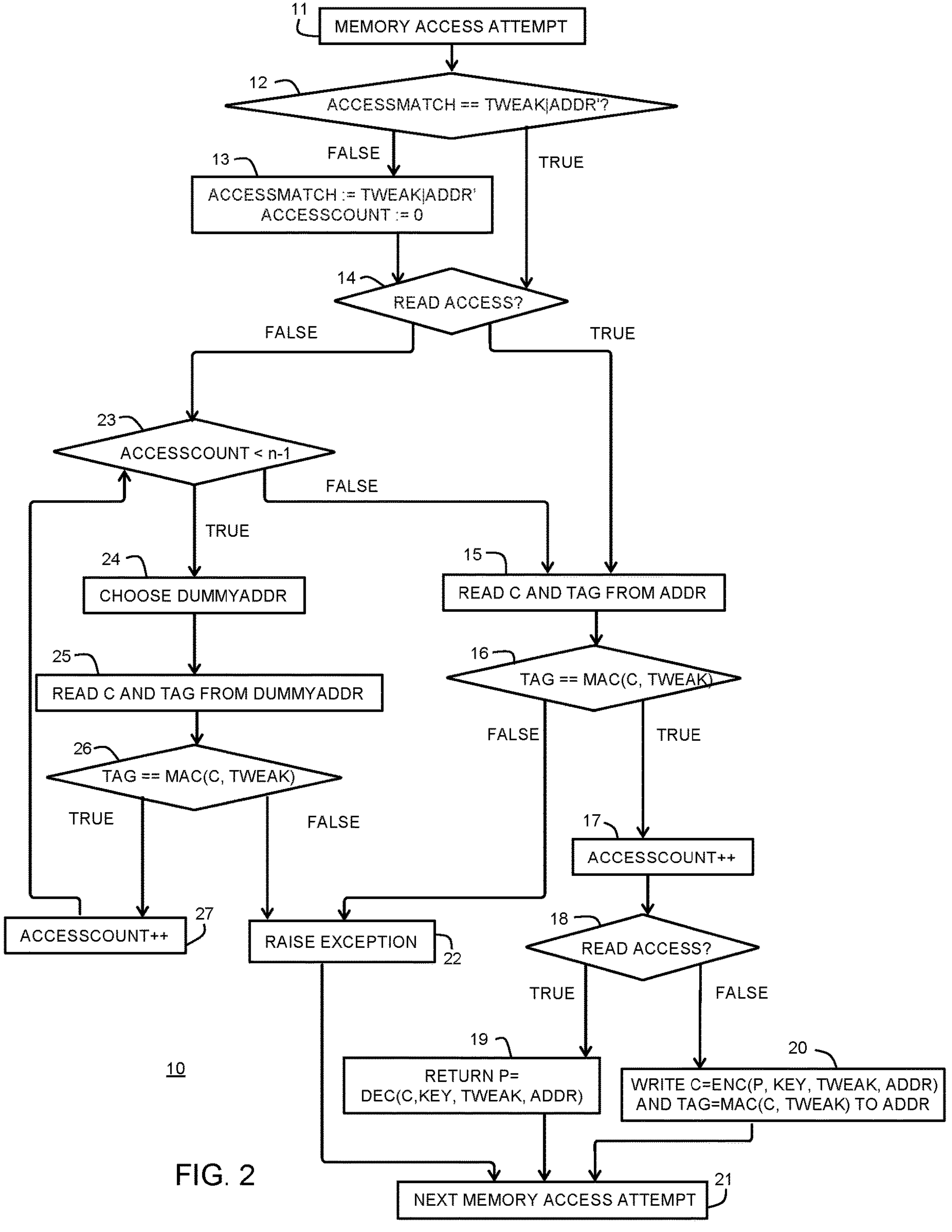
FIG. 2 illustrates a method of memory isolation security in accordance with an embodiment.

FIG. 2 illustrates method 10 for memory isolation security in accordance with an embodiment. Method 10 will be discussed with reference to data processing system 30 in FIG. 1. Prior to beginning method 10, and when data is encrypted and stored in the memory, access match register 37 accessMatch is loaded with a tweak value concatenated with address bits defining an address range of memory 34. Also, a tag is stored in a register of cipher circuit 33 for the address range 39, where the tag includes a MAC of the encrypted data C and the tweak value T for the address range. Method 10 begins at block 11 where a memory access is attempted. At decision block 12, it is determined if the access match register 37 accessMatch compares favorably, i.e., matches with the tweak value concatenated with the truncated address addr' of the memory region 39 being accessed. If they match, then the TRUE path is taken from decision block 12 to decision block 14. At decision block 14, it is determined if the access is a read access or a write access. If the access is a read access, the TRUE path is taken to block 15 where the encrypted data C and the TAG are read from the address being read. At decision block 16, if the stored tag does not match with the MAC calculated from the encrypted data C and the tweak value from the address being accessed, then the FALSE path is taken to block 22 and an exception is raised. If however, at decision block 16, it is determined that the stored tag equals the MAC of the encrypted data C and the tweak from the address being read, then the TRUE path is taken from block 16 to block 17 where the access count register 38 accessCount is updated. In one embodiment, the accessCount is updated by incrementing by one. In another embodiment, the counter may count down, so that the access count register 38 is decremented instead of incremented. At decision block 18, it is again determined if the access is a read or write access. If the access is a write access, the FALSE path is taken to block 20 and the data to be written is encrypted so that encrypted data C=Enc(P, key, tweak, addr). If the access is a read access, the TRUE path is taken to block 19 where the stored data is decrypted to return P=Dec(C, key, tweak, addr). At block 21 the memory access is complete and a next memory access can attempted, and the method returns to block 11.

Returning the discussion back to block 12, if it is determined that the access match register 37 accessMatch does not compare favorably with the tweak value concatenated with the truncated address addr' of the memory region 39 being accessed, then either the tweak value is wrong or the memory region has not been initialized. The FALSE path is taken from decision block 12 to block 13, and the access match and access count registers 37 and 38 are initialized for the memory region being accessed. If at decision block 14, the access is a write access, the FALSE path is taken to decision block 23. Decision block 23 begins a loop for performing multiple dummy read validations before a write access can be validated. At decision block 23, it is determined if the access counter register 37 accessCount is less than n−1, where n is predetermined to be the number of validations required for a write access validation. If the accessCount is not less than n−1, then the required number of dummy read accesses have been performed and the FALSE path is taken to block 15 and method 10 proceeds as described above for blocks 15-22. If, at decision block 23, it is determined that the number of accesses is less than n−1, then the TRUE path is taken to block 24. At block 24, a dummy address is chosen. The dummy address can, for instance, be chosen as dummyAddr=addr'+(addr+i mod 2 (32−r)) for i=1 . . . (n−accessCount−1) as described above. In other embodiments, it can be chosen differently. At block 25, the encrypted data C and the TAG are read from the dummy address dummyAddr. At decision block 26, if the stored tag does not match with the TAG calculated from the MAC of the encrypted data C and the tweak from the dummy address being accessed, then the FALSE path is taken to block 22 and an exception is raised. If however, at decision block 26, it is determined that the stored tag TAG equals the MAC of the encrypted data C and the tweak from the dummy address being read, and the TRUE path is taken from block 26 to block 27 where the accessCount is updated. From block 27, the method returns to decision block 23, where the access count register accessCount is again checked, and depending on the current value of n−1, method 10 either runs through the loop again, that is, repeats blocks 23-27, or proceeds to block 15 where the method continues as described above.

Using this technique, the security for write accesses of a memory of a small embedded processing system is increased without requiring the use of an MPU, and without the use of a full-sized MAC.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms “a” or “an,” as used herein, are defined as one or more than one. Also, the use of introductory phrases such as “at least one” and “one or more” in the claims should not be construed to imply that the introduction of another claim element by the indefinite articles “a” or “an” limits any particular claim containing such introduced claim element to inventions containing only one such element, even when the same claim includes the introductory phrases “one or more” or “at least one” and indefinite articles such as “a” or “an.” The same holds true for the use of definite articles.

Unless stated otherwise, terms such as “first” and “second” are used to arbitrarily distinguish between the elements such terms describe. Thus, these terms are not necessarily intended to indicate temporal or other prioritization of such elements.

What is claimed is:

1. A data processing system comprising:

a memory system having a plurality of memory regions configured to store information;

a processor configured to execute instructions to access an address in the memory system; and a memory integrity circuit coupled to the processor and to the memory system, the memory integrity circuit configured to validate read accesses and write accesses to the memory system by the processor, wherein a write access to an address of a memory region of the plurality of memory regions is validated in response to n number of the read accesses being validated prior to the write access, where n is an integer, and in response to correctly calculating a message authentication code (MAC) of a combination of encrypted data stored at the address and a first tweak value;

wherein the memory integrity circuit is configured to:

choose a dummy address for a first read access;

read a first tag for the dummy address, wherein the first tag includes a MAC function of encrypted data and a second tweak value for an address range including the address for the write access;

perform the write access based on the second tweak value and the MAC indicating the MAC is correctly calculated.

2. The data processing system of claim 1, wherein a size of the MAC is determined by a number of parity bits that were designated per memory word of the memory system, and wherein the MAC is stored in a memory portion of the memory system reserved for the number of parity bits.

3. The data processing system of claim 1, wherein the memory system is a tightly coupled memory (TCM) having a dedicated connection to the processor.

4. The data processing system of claim 1, further comprising an access match value, the access match value further comprises the first tweak value concatenated with a truncated address of the memory region.

5. The data processing system of claim 4, wherein the access match value is stored in a register of the processor.

6. The data processing system of claim 1, wherein each of the n number of read accesses are directed to one of n number of dummy addresses.

7. The data processing system of claim 1, wherein an exception is raised in the processor when the MAC is not correctly calculated.

8. The data processing system of claim 7, wherein the exception is not raised until an nth read access is not validated.

9. A method of providing isolation security for a memory, the method comprising:

storing an access match value comprising a tweak value concatenated with address bits defining an address range in the memory;

receiving a request to access the memory;

determining that the access is a write access to an address of the memory;

determining that an access count of accesses to the memory is less than a predetermined value;

choosing a dummy address for a read access;

reading a first tag for the dummy address, wherein the first tag equaling a message authentication code (MAC) function of respective encrypted data and the tweak value for the address range, wherein the first tag is stored in a memory location of the memory that is sized to store parity bits;

calculating a second tag, the second tag equaling a MAC function of encrypted data stored at the dummy address and the tweak value;

comparing the second tag with the first tag to determine that the access is valid when the first tag matches the second tag;

updating the access count in response to the first tag and the second tag matching;

determining that the updated access count is equal to the predetermined value;

calculating a third tag as a MAC function of encrypted data at the address to be written to and the tweak value; and performing the write access when the third tag and the first tag match.

10. The method of claim 9, wherein the dummy address is an address within the address range.

11. The method of claim 9, wherein the access match value, the access count, and the first tag are stored in a register of a processor coupled to the memory.

12. The method of claim 9, further comprising raising an exception when the first tag and the second tag tags do not match compare favorably to each other.

13. The method of claim 9, wherein performing the write access further comprises writing the encrypted data and the second tag to the address being written to.

14. The method of claim 9, wherein a size of the MAC is determined by a number of parity bits that were designated per word in the memory, and wherein the MAC is stored in the memory location reserved for the parity bits.

15. A computer program comprising instructions stored in a non-transitory memory that when executed perform operations comprising:

storing an access match value comprising a tweak value concatenated with address bits defining an address range in the non-transitory memory;

receiving a request to access the non-transitory memory;

determining that the access is a write access to an address of the non-transitory memory;

determining that an access count of accesses to the memory is less than a predetermined value;

choosing a dummy address for a read access;

reading a first tag for the dummy address, wherein the first tag equaling a message authentication code (MAC) function of respective encrypted data and the tweak value for the address range, wherein the first tag is stored in a memory location of the non-transitory memory that is sized to store parity bits;

calculating a second tag, the second tag equaling a MAC function of encrypted data stored at the dummy address and the tweak value;

comparing the second tag with the first tag to determine that the access is valid when the first tag matches the second tag;

updating the access count in response to the first tag matching the second tag;

determining that the updated access count is equal to the predetermined value;

calculating a third tag as a MAC function of encrypted data at the address to be written to and the tweak value; and performing the write access when the third tag matches the first tag.

16. The computer program of claim 15, wherein the dummy address is an address within the address range.

17. The computer program of claim 15, wherein the access match value, the access count, and the first tag are stored in a register of a processor coupled to the non-transitory memory.

18. The computer program of claim 15, further comprising raising an exception when the first tag and the second tag do not match.

19. The computer program of claim 15, wherein performing the write access further comprises writing the encrypted data and the first tag to the address being written to.

20. The computer program of claim 15, wherein a size of the MAC is determined by a number of parity bits that were designated per word in the non-transitory memory, and wherein the MAC is stored in the memory location reserved for the parity bits.

* * * * *